(12) United States Patent     (10) Patent No.:   US 12,566,765 B2

Fayyaz et al.     (45) Date of Patent:   **\*Mar. 3, 2026**

(54) EXECUTING A CLIENT MODEL USING A TASK PROMPT PRODUCED BY A MAIN SYSTEM

(71) Applicant: Microsoft Technology Licensing, LLC, Redmond, WA (US)

(72) Inventors: Mohsen Fayyaz, Berlin (DE); Ayyoob Imanigooghari, Munich (DE); Eric Chris Wolfgang Sommerlade, Oxford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

This patent is subject to a terminal disclaimer.

(21) Appl. No.: 18/244,229

(22) Filed: Sep. 9, 2023

(65) Prior Publication Data

US 2025/0086187 A1     Mar. 13, 2025

(51) Int. Cl.
    *G06F 16/2455*     (2019.01)
(52) U.S. Cl.
    CPC ............................... *G06F 16/24564* (2019.01)
(58) Field of Classification Search
    None
    See application file for complete search history.

(56) References Cited

U.S. PATENT DOCUMENTS

2020/0349919 A1   11/2020   Wanas et al.
2021/0217408 A1 *   7/2021   Hakkani-Tur ........... G06N 3/02
2022/0004819 A1 *   1/2022   Modi .................. G06F 18/2321
2023/0214689 A1 *   7/2023   Tian .......................... G06N 5/04
                                                                  704/9
2023/0244938 A1   8/2023   Wei et al.
2024/0176958 A1   5/2024   Raimondo et al.
2024/0289362 A1 *   8/2024   Williams ............... G06Q 50/01
2024/0311575 A1   9/2024   Baeuml et al.
2024/0354319 A1   10/2024   Dinu et al.
2024/0394479 A1   11/2024   Pathak et al.

(Continued)

FOREIGN PATENT DOCUMENTS

WO        2023022727 A1     2/2023

OTHER PUBLICATIONS

Gu et al., From Server-Based to Client-Based Machine Learning: A Comprehensive Survey, ACM Computing Surveys, vol. 54, No. 1, Article 6, pp. 6:1-6:36. (Year: 2020).*

(Continued)

*Primary Examiner* — Taelor Kim

(57)             ABSTRACT

A technique executes a client machine-trained model ("client model") on a client device. In operation, the client device submits a description of a task to be performed by the client device to a network-accessible main system. The main system uses a main-system machine-trained model ("main-system model") to produce a task prompt based on the task description. The client device subsequently uses the task prompt to process queries pertaining to the task. The main-system is trained to increase the accuracy of responses produced by the client model, while reducing the sizes of task prompts produced by the main system. The training process is performed by holding weights of the client model constant.

18 Claims, 8 Drawing Sheets

(56) References Cited

U.S. PATENT DOCUMENTS

| | | |
|---|---|---|
| 2025/0005276 A1* | 1/2025 | Bhat ........................ G06F 40/20 |
| 2025/0005427 A1 | 1/2025 | Venkateswaran et al. |
| 2025/0006052 A1 | 1/2025 | Williams et al. |
| 2025/0028751 A1 | 1/2025 | Yu et al. |
| 2025/0053748 A1 | 2/2025 | Fayyaz et al. |

OTHER PUBLICATIONS

Devlin, et al., "BERT: Pre-training of Deep Bidirectional Transformers for Language Understanding," arXiv, Cornell University, arXiv:1810.04805v2 [cs.CL], May 24, 2019, 16 pages.
Scao, et al., "BLOOM: A 176B-Parameter Open-Access Multilingual Language Model," arXiv, Cornell University, arXiv:2211.05100v2 [cs.CL], Dec. 11, 2022, 62 pages.
Vaswani, et al., "Attention Is All You Need," in 31st Conference on Neural Information Processing Systems (NIPS 2017), 2017, 11 pages.
Brown, et al., "Language Models are Few-Shot Learners," arXiv, Cornell University, arXiv:2005.14165v4 [cs.CL], Jul. 22, 2020, 75 pages.
"Introducing the World's Largest Open Multilingual Language Model: BLOOM," available at https://bigscience.huggingface.co/blog/bloom, accessed on Feb. 13, 2023, 2 pages.
Houlsby, et al., "Parameter-Efficient Transfer Learning for NLP," arXiv, Cornell University, arXiv:1902.00751v2 [cs.LG], Jun. 13, 2019, 13 pages.
Pfeiffer, et al., "AdapterFusion: Non-Destructive Task Composition for Transfer Learning," arXiv, Cornell University, arXiv:2005.00247v3, Jan. 26, 2021, 17 pages.
Pfeiffer, et al., "AdapterHub: A Framework for Adapting Transformers," in Proceedings of the 2020 Conference on Empirical Methods in Natural Language Processing: System Demonstrations, 2020, 9 pages.
Hu, et al., "LoRA: Low-Rank Adaptation of Large Language Models," in Proceedings of 10th International Conference on Learning Representations, Apr. 25, 2022, 13 pages.
Rafailov, et al., "Direct Preference Optimization: Your Language Model is Secretly a Reward Model," arXiv, Cornell University, arXiv:2305.18290v1 [cs.LG], May 29, 2023, 26 pages.
Lester, Brian, "Guiding Frozen Language Models with Learned Soft Prompts," available at https://ai.googleblog.com/2022/02/guiding-frozen-language-models-with.html, Google Research Blogs, Feb. 10, 2022, 5 pages.
Lester, et al., "The Power of Scale for Parameter-Efficient Prompt Tuning," arXiv, Cornell University, arXiv:2104.08691v2 [cs.CL], Sep. 2, 2021, 15 pages.
Rao, et al., "DynamicViT: Efficient Vision Transformers with Dynamic Token Sparsification," in 35th Conference on Neural Information Processing Systems (NeurIPS 2021), 2021, 13 pages.
Hu, at al., "LoRA: Low-Rank Adaptation of Large Language Models," arXiv, Cornell University, arXiv:2106.09685v2 [cs.CL], Oct. 16, 2021, 26 pages.
Touvron, et al., "LLaMA: Open and Efficient Foundation Language Models," arXiv, Cornell University, arXiv:2302.13971v1 [cs.CL], Feb. 27, 2023, 27 pages.
Fayyaz, et al., "Compressing Information Provided to a Machine-Trained Model Using Abstract Tokens," U.S. Appl. No. 18/232,485, filed Aug. 10, 2023, 62 pages.
International Search Report and Written Opinion received for PCT Application No. PCT/US2024/041380, mailed on Nov. 25, 2024, 14 pages.
U.S. Appl. No. 18/232,485, filed Aug. 10, 2023 (pending).
Gupta, "Compression of Deep Learning Models for Text: A Survey," arXiv, arXiv:2008.05221v4 [cs.CL], Jun. 13, 2021, 53 pages.
Chen, et al., "Stabilized In-Context Learning with Pre-trained Language Models for Few Shot Dialogue State Tracking," arXiv, arXiv:2302.05932v1 [cs.CL], Feb. 12, 2023, 14 pages.
Santra, et al., "Frugal Prompting for Dialog Models," arXiv, arXiv:2305.14919v1 [cs.CL], May 24, 2023, 22 pages.
PCT Search Report and Written Opinion for PCT/US2024/037265, mailing date Oct. 22, 2024, 17 pages.
Banino, et al., "PonderNet: Learning to Ponder," arXiv, arXiv:2107.05407v2 [cs.LG], Sep. 2, 2021, 18 pages.
Radford, et al., "Improving Language Understanding by Generative Pre-Training," available at https://cdn.openai.com/research-covers/language-unsupervised/language_understanding_paper.pdf, OpenAI, San Francisco, California, Jun. 11, 2018, 12 pages.
Hedge, et al., "Variational Student: Learning Compact and Sparser Networks in Knowledge Distillation Framework," International Conference on Acoustics, Speech and Signal Processing (ICASSP), 2020, pp. 3247-3251.
Non-Final Office Action mailed on Jul. 2, 2025, in U.S. Appl. No. 18/232,485, 28 pages.

* cited by examiner

Figure 3:
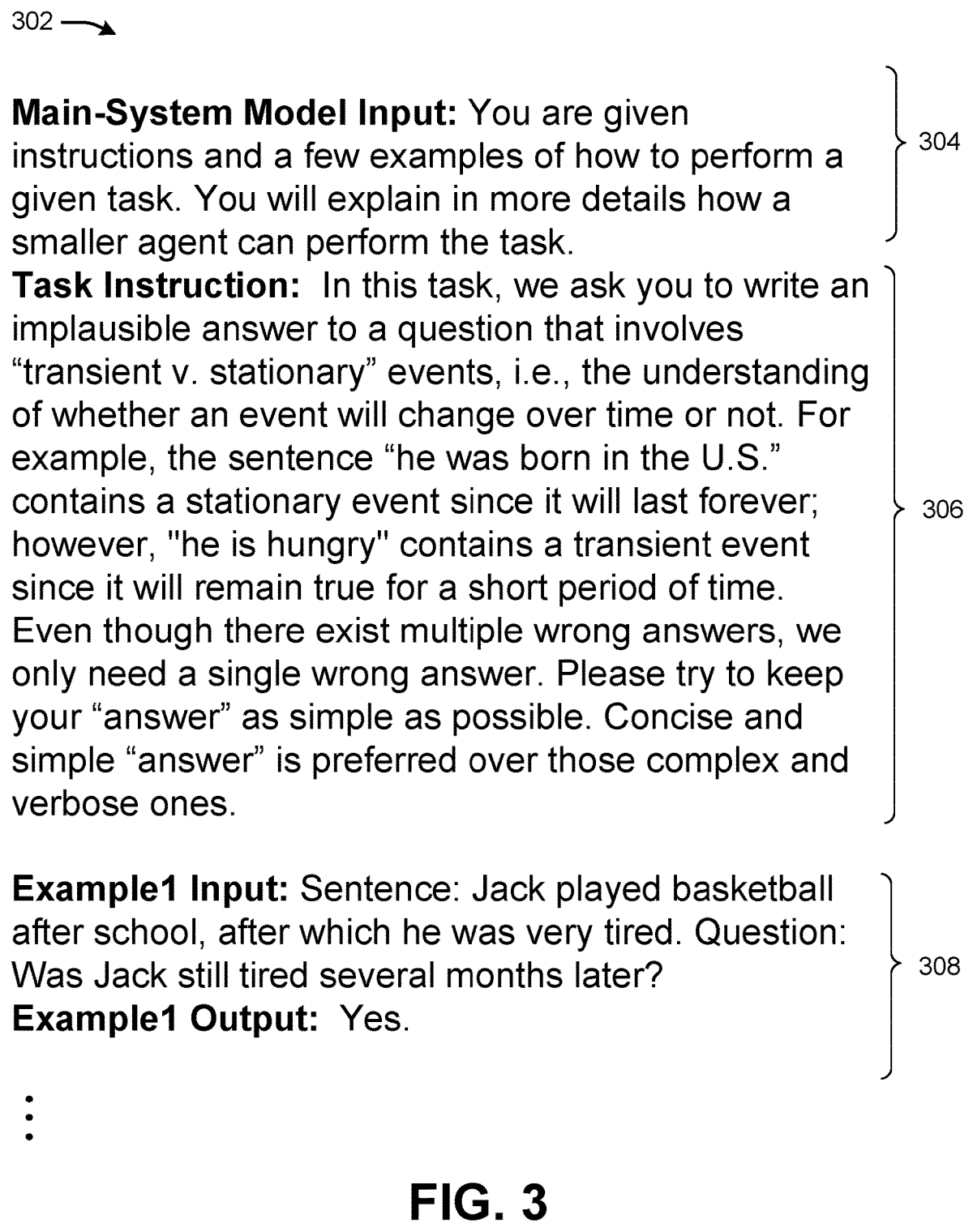

302 ⟶

Main-System Model Input: You are given instructions and a few examples of how to perform a given task. You will explain in more details how a smaller agent can perform the task.

⎫ 304

Task Instruction: In this task, we ask you to write an implausible answer to a question that involves "transient v. stationary" events, i.e., the understanding of whether an event will change over time or not. For example, the sentence "he was born in the U.S." contains a stationary event since it will last forever; however, "he is hungry" contains a transient event since it will remain true for a short period of time. Even though there exist multiple wrong answers, we only need a single wrong answer. Please try to keep your "answer" as simple as possible. Concise and simple "answer" is preferred over those complex and verbose ones.

⎫ 306

Example1 Input: Sentence: Jack played basketball after school, after which he was very tired. Question: Was Jack still tired several months later?
Example1 Output: Yes.

MACHINE-TRAINED
MODEL

402

POST PROCESSING COMPONENT 426

OUTPUT EMBEDDING INFORMATION 424

428

NTH TRANSFORMER COMPONENT 422

SECOND TRANSFORMER COMPONENT 420

418

ADD & NORMALIZE COMPONENT 2
414

FFN COMPONENT
412

ADD & NORMALIZE COMPONENT 1
410

ATTENTION HEAD 1
416

ATTENTION
COMPONENT
408

FIRST TRANSFORMER
COMPONENT 404

406

430

Overview of Operation of the Client Device, 602

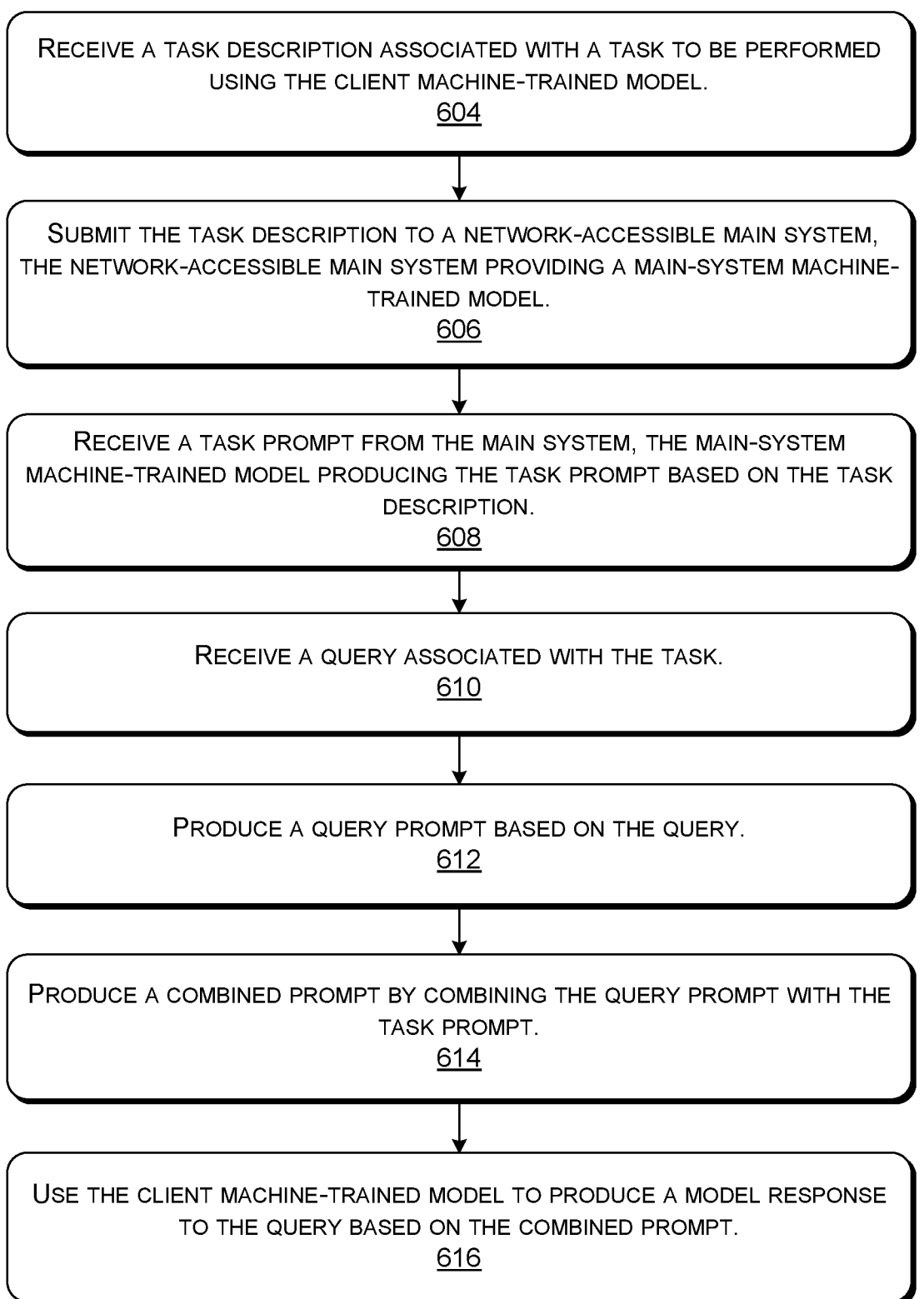

RECEIVE A TASK DESCRIPTION ASSOCIATED WITH A TASK TO BE PERFORMED USING THE CLIENT MACHINE-TRAINED MODEL.
604

SUBMIT THE TASK DESCRIPTION TO A NETWORK-ACCESSIBLE MAIN SYSTEM, THE NETWORK-ACCESSIBLE MAIN SYSTEM PROVIDING A MAIN-SYSTEM MACHINE-TRAINED MODEL.
606

RECEIVE A TASK PROMPT FROM THE MAIN SYSTEM, THE MAIN-SYSTEM MACHINE-TRAINED MODEL PRODUCING THE TASK PROMPT BASED ON THE TASK DESCRIPTION.
608

RECEIVE A QUERY ASSOCIATED WITH THE TASK.
610

PRODUCE A QUERY PROMPT BASED ON THE QUERY.
612

PRODUCE A COMBINED PROMPT BY COMBINING THE QUERY PROMPT WITH THE TASK PROMPT.
614

USE THE CLIENT MACHINE-TRAINED MODEL TO PRODUCE A MODEL RESPONSE TO THE QUERY BASED ON THE COMBINED PROMPT.
616

FIG. 6

OVERVIEW OF OPERATION OF THE MAIN SYSTEM, 702

RECEIVE A TASK DESCRIPTION FROM THE CLIENT DEVICE OVER A COMPUTER NETWORK, THE TASK DESCRIPTION DESCRIBING A TASK TO BE PERFORMED BY THE CLIENT DEVICE USING A CLIENT MACHINE-TRAINED MODEL.
704

USE A MAIN-SYSTEM MACHINE-TRAINED MODEL TO TRANSFORM THE TASK DESCRIPTION INTO A TASK PROMPT.
706

SEND THE TASK PROMPT OVER THE COMPUTER NETWORK TO THE CLIENT DEVICE, THE CLIENT MACHINE-TRAINED MODEL USING THE TASK PROMPT TO TRANSFORM A QUERY PERTAINING TO THE TASK INTO A MODEL RESPONSE.
708

FIG. 7

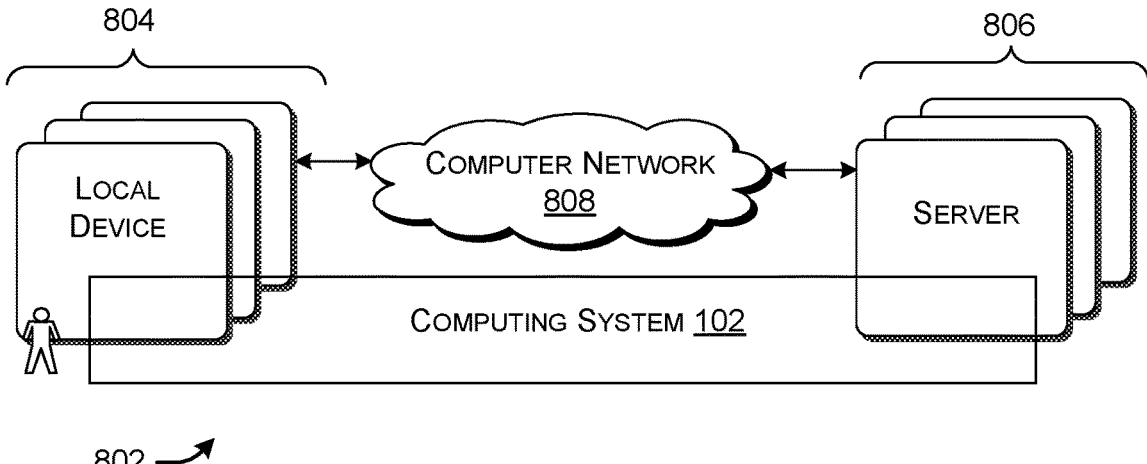

FIG. 8

EXECUTING A CLIENT MODEL USING A TASK PROMPT PRODUCED BY A MAIN SYSTEM

BACKGROUND

Large language models are capable of successfully responding to a broad range of input queries. But these language models use a large number of parameters, in some cases, several billion parameters. Not every computing device is capable of storing and implementing such a large langue model. For example, a user computing device that has limited memory and processing resources may not be able to feasibly implement a large language model. It is also impractical to download a large language model from a source system.

To overcome this limitation, an application can be configured to interact with a network-accessible language model. This solution, however, is not ideal. First, interaction with a network-accessible model incurs a latency cost. Second, an application developer may wish to eliminate interaction with a network-accessible model for privacy-related reasons. Further, a client-side application does not have uninterrupted access to a network-accessible model at all times The technical literature has proposed the use of smaller language models. But reducing the size of a language model also negatively impacts its ability to understand a broad range of queries. One way of addressing this constraint is by fine-tuning the smaller language model to perform particular tasks of interest to a user. This manner of customizing a language model, however, is resource-intensive and time-consuming, and does not yield a language model that is capable of satisfactorily performing other tasks for which it was not fine-tuned.

SUMMARY

A technique is described herein for executing a client machine-trained model ("client model") on a client device. In operation, the client device submits a description of a task to be performed by the client device to a network-accessible main system. The main system uses a main-system machine-trained model ("main-system model") to produce a task prompt based on the task description. The client device subsequently uses the task prompt to process queries pertaining to the task. More specifically, upon receiving a query, the client device produces a combined prompt that includes the task prompt and a query prompt that represents the query. The client model transforms the combined prompt into a model response.

According to another illustrative aspect, the client model has fewer weights than the main-system model, and therefore has a smaller size than the main-system model.

According to another illustrative aspect, the technique further includes acquiring an interface program from a network-accessible data store, and using the interface program to interact with the main system.

According to another illustrative aspect, a training process trains the main-system model to satisfy two objectives: increasing accuracy of model responses produced using the client machine-trained model using task prompts produced by the main-system model; and reducing sizes of the task prompts produced by the main-system model.

According to one technical benefit, the technique enables a reduced-size client model to run on a client device without jeopardizing the quality of the client model's responses.

According to another technical benefit, the technique enables the client model to produce high-quality responses to queries associated with different tasks without fine-tuning the client model (and/or soft prompts) to perform those tasks. By eliminating the process of task-specific fine-tuning, the technique eliminates the need to produce a corpus of task-specific training examples, and then devote the necessary time and resources to perform fine-tuning on the basis of those training examples.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 shows an illustrative task description submitted by the client device of FIG. 1 to the main system of FIG. 1.

FIG. 6 shows a process that explains one manner of operation of the client device of FIG. 1.

FIG. 7 shows a process that explains one manner of operation of the main system of FIG. 1.

FIG. 8 shows computing equipment that, in some implementations, is used to implement the computing system of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

A. Illustrative System

Figure 1:
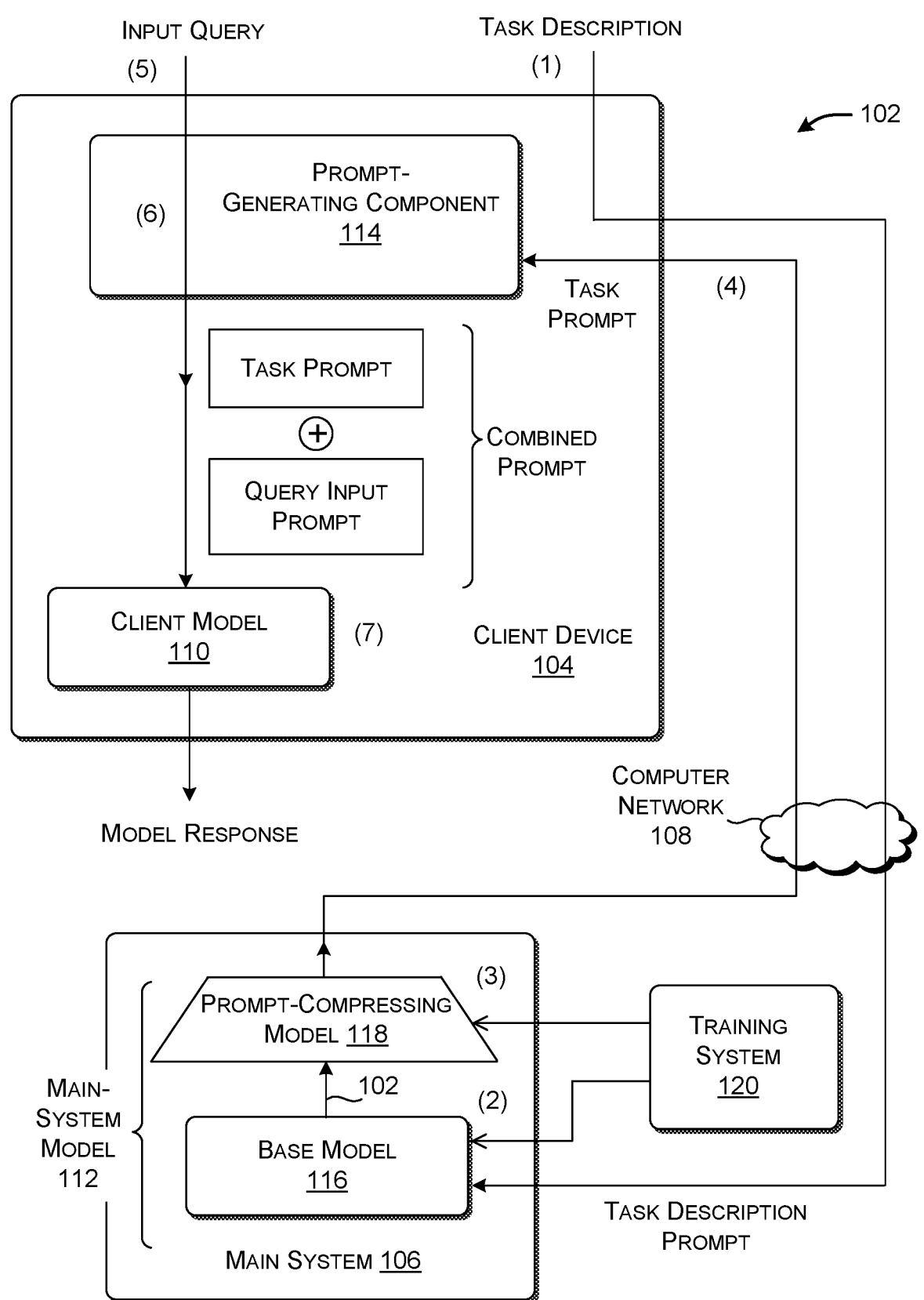
FIG. 1 shows a system in which a client device executes a client model based on a task prompt produced by a main-system model provided by a main system.

FIG. 1 shows a computing system 102 in which a client device 104 interacts with a main system 106 over a computer network 108. In some implementations, the client device 104 is implemented using a user computing device, including any type of mobile computing device (e.g., a smartphone) or any type of personal computing device that is designed primarily for non-mobile use, etc. The main system 106 is implemented by one or more servers. The computer network 108 is implemented by any type of wide-area network (e.g., the Internet) or a local area network or a point-to-point connection. The client device 104 includes a client machine-trained model ("client model") and the main system 106 includes a main-system machine-trained model ("main-system model").

Figure 9:
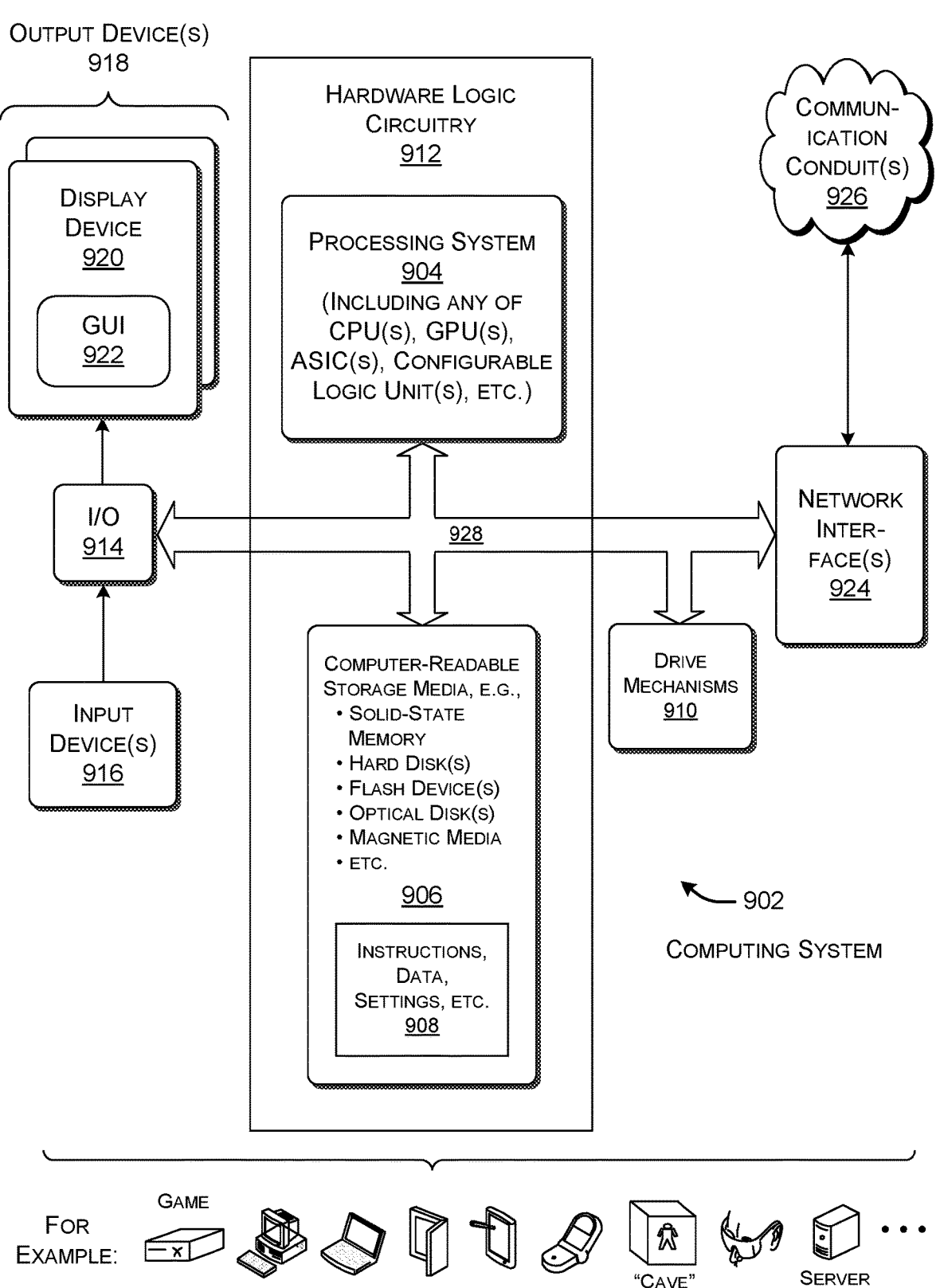
FIG. 9 shows an illustrative type of computing system that, in some implementations, is used to implement any aspect of the features shown in the foregoing drawings.

By way of terminology, a "machine-trained model" refers to computer-implemented logic for executing a task using machine-trained weights that are produced in a training operation. A "weight" refers to any type of parameter value that is iteratively produced by the training operation. A "token" refers to a unit of information processed by the machine-trained model, such as a word or a part of a word. In some cases, a tokenizer produces the tokens, but an item (e.g., a text passage) is said to be composed of tokens in a general sense (in which "token" is a synonym of "part"), irrespective of when and where those tokens are actually produced. An "embedding" is a distributed vector that represents an information item in a vector space. A "distributed vector," in turn, expresses the semantic content of an information item by distributing information over its k dimensions. A distributed vector is in contrast to a sparse one-hot vector that allocates particular dimensions of the vector to particular concepts. In some contexts, terms such as "component," "module," "engine," and "tool" refer to parts of computer-based technology that perform respective functions. FIGS. 8 and 9, described below, provide examples of illustrative computing equipment for performing these functions.

In some implementations, the client model 110 and the main-system model 112 process text-based tokens. In other implementations, the models (110, 112) are multi-modal in nature, and are capable of processing any type(s) of tokens. For example, in some implementations, the models (110, 112) process input information that includes any combination of text-based tokens, image-based tokens, video-based tokens, audio-based tokens, etc. For instance, a tokenizer produces image-based tokens by partitioning an image into patches, each of size n×m pixels. To facilitate explanation, however, the following explanation presents examples in which the models (110, 112) process text-based tokens.

There are two phases in the client device's operation: a task-defining phase and a query-submission phase. In the first phase, in operation (1), a user submits a text-based description ("task description") to the main system 106. The task description describes a particular task that is to be performed by the client device 104 using the client model 110. In operations (2) and (3), the main-system model 112 transform the task description into a task prompt. In operation (4), the client device 104 receives and stores the task prompt. A "prompt" is a sequence of elements (e.g., tokens) that is actually input to a machine-trained model.

In the second phase, in operation (5), the client device receives an input query that pertains to the task described in the task description. In operation (6), a prompt-generating model 114 produces a combined prompt that includes two parts concatenated together. A first part is the task prompt produced by the main system 106. A second part is a query prompt that represents the query. In operation (7), the client model 110 transforms the combined prompt into a model response.

Each token in the query prompt represents a part of the query. In some implementations, the query prompt also expresses any document or other content referenced by the query. For example, assume that a user is viewing a web page, and asks a question about an online news article, such as "What is the name of the city that is being discussed in this article I am reading?" In response, the prompt-generating model 114 generates a query prompt that incudes text tokens drawn from the user's question itself and the web page.

In some implementations, each part of the task prompt is abstract information that represents part of the task description. The information is said to be abstract because its underlying meaning may not be self-evident to a human observer, unlike a text token which is associated with an identifiable fragment of input text. In some implementations, each part of the task prompt is a token or an embedding (e.g., a distributed vector) that represents the token. The main-system model 112 produces the task prompt such that its abstract parts will not conflict with the vocabulary of available text-based tokens from which the query prompt is composed.

In some implementations, the client model 110 is implemented as a language model. Likewise, the main-system model 112 is implemented as a language model. Section B describes a transformer-based language model 112 that can be used to implement the client model 110 and the main-system model 112. In some implementations, the main-system model 112 is larger than the client model 110 by multiples (in some cases, 10× larger, 100× larger, 1000× larger, etc.). For example, the main-system model 112 can have several hundred billions weights while the client model 110 can have a few billion weights, or even less than a billion weights (a few million weights in one case). The large size of the main-system model 112 enables it to understand a wide variety of queries without prior training, and with minimal priming using submitted prompts. In some implementations, the client model's vector space is a simplified approximation of the vector space of the main-system model 112. In other cases, there is no expectation that the vector space of the client model 110 matches the vector space of the main-system model 112. In any event, the relatively smaller size of the client model 110 enables a client device 104 with modest memory and processing resources to successfully download, store, and run the client model 110. This type of client device 104 could not do the same with respect to the main-system model 112 which includes, for example, hundreds of billions of weights.

In some implementations, the main-system model 112 includes a base model 116 and a prompt-compressing model 118. In some implementations, for example, the base model 116 is a large language model, e.g., having the model architecture described in Section B. The base model 116 transforms a task description received by the client device 104 into an initial task prompt having a first size. In some implementations, the prompt-compressing model 118 includes a linear fully-connected feed-forward neural network (FFN) having one or more layers. The prompt-compressing model 118 is trained to convert the initial task prompt into a final task prompt having a second size that is smaller than the first size. In other words, the prompt-compressing model 118 compresses the initial task prompt. The task prompt produced by the prompt-compressing model 118 is forwarded to the client device 104. In other implementations, the base model 116 itself is trained to incorporate a function which ensures that a suitably-economical task prompt is produced, without the use of a separate prompt-compressing model 118. In other cases, the main-system model 112 omits its compression functionality, in whatever manner implemented. In these cases, the main system 106 provides uncompressed abstract tokens to the client device 104.

A training system 120 trains the computing system 102 in a manner discussed more fully in Section C. In some implementations, the training system 120 trains the weights of the main-system model 112 while holding the weights of the client model 110 fixed. Generally, the training system 120 trains the main-system model 112 to satisfy two objectives. First, the training system 120 attempts to produce task prompts that will subsequently enable the client model 110 to accurately transform queries associated with different tasks into model responses. In doing so, the training system 120 learns the representational vector space associated with the client model 110. Second, the training system 120 attempts to produce succinct task prompts. A succinct task prompt is a task prompt which expresses the semantic meaning of a task description with an economical number of parts (e.g., tokens or token embeddings).

In some implementations, the client device 104 is one of plural client devices (not shown), each of which uses the same client model 110. That is, the client model 110 is defined by its architecture and its weights. The statement that all client devices have the same client model is equivalent to saying that the client devices use the same model architecture that is instantiated by the same set of weights. By extension, all instantiations of the client model 110 operate using the same representational client vector space. In this case, the trained main-system model 112 is capable of producing task prompts for all of the client models used by the client devices, since the main-system model 112 has learned the single representational vector space associated with all instantiations of the client model 110.

Other environments can vary the above configuration in different ways. In one such variation, the computing system 102 provides two or more task-specific main-system models (not shown). For example, a first main-system model is configured to produce task prompts for image-processing tasks, and a second main-system model is configured to produce task prompts for text-based chat applications. A user who is performing an image-processing task will interact with the first main-system model to obtain a task prompt, and a user who is performing a text-based chat task will interact with the second main-system model to obtain a task prompt. The computing system 102 can likewise include different client models for use with different main-system models, e.g., using a first client model to interact with the first main-system model, and a second client model to interact with the second main-system model. This variation can achieve the dual benefit of increasing the accuracy of the client models and main-system models, while reducing their sizes. That is, the models can be smaller because they are configured to handle a smaller domain of tasks.

In another variation, a single main-system model 112 can be configured to generate task prompts for different types of client models. In this case, each client device can notify the main system 106 of its client model type when it sends a task description to the main system 106. The main-system model 112 will then provide an appropriate task prompt for this client model. The main-system model 112 is capable of this versatility assuming that it has been trained on training data that express the expanded complexity of its use with plural client models.

To facilitate explanation, the remainder of this disclosure will assume that the base case applies in which the single main-system model 112 produces task prompts for a single type of client model 110, in which all instantiations of the client model 110 have the same weights.

The computing system 102 of FIG. 1 has a number of technical advantages. First, the computing system 102 allows a client device 104 having limited memory and processing resources to implement a client model 110. Second, the client model 110 is able to produce good-quality model responses for different tasks without training the weights of the client model 110 to perform these tasks. This is a significant advantage because it requires a considerable amount of time and resources (e.g., memory resources and processing resources) to train a model. Training is especially challenging for a client device 104 having limited resources. Training also requires a developer to produce a task-specific set of training examples for each task. The technique applied by the computing system 102 avoids all this training activity.

Third, the computing system 102 provides adaptable and scalable technique for enabling client devices to implement machine-trained models. This is because the main-system model 112 learns how to transform task descriptions into task prompts, which are then subsequently used by client devices to perform associated tasks. In this way, once trained, the main-system model 112 serves as a general-purpose utility that is capable of producing good-quality prompts, even for tasks it was not trained on. In contrast, when the weights of the client model 110 are fine-tuned to perform a particular task, there is no guarantee that the client model 110 will be able to provide good-quality responses on another task for which it was not trained. If poor response quality is encountered, the developer will be forced to re-train the client model 110 for the new task, which involves producing a new set of training examples for this task.

Note that the technique used by the computing system 102 is also superior to the competing techniques of prompt engineering and prompt tuning. In some implementations of prompt engineering, a developer attempts to manually craft a prompt which accurately describes a task. In prompt tuning, a training system iteratively adjusts the weights of a "soft prompt." Then, a computing device subsequently uses the soft prompt as a preamble in the final prompts it submits to a language model.

The technique used by the computing system 102 is superior to prompt engineering because it produces a task prompt without requiring a developer to spend the time and effort to develop a prompt. The technique used by the computing system 102 also consistently produces good-quality task prompts; the same cannot be said for manually-produced task prompts. Further note that, the task prompts produced by the main-system model 112 include abstract information which may not be intelligible to human interpretation, and therefore cannot be manually produced by a developer.

The technique used by the computing system 102 is superior to prompt tuning because it does not require task-specific tuning of any information. That is, the technique of prompt tuning avoids the task of fine-training the weights of a language model, but the prompt tuning still involves iteratively performing task-based training of the soft prompts that will be submitted to the language model. It further requires a corpus of training examples to carry out this training.

As a fourth advantage, the prompt-compressing model 118 is able to reduce the size of its combined prompt by using a reduced-sized task prompt produced by the main-system model 112. This capability, in turn, allows the client model 110 to reduce the amount of memory and processing resources that it uses to process the combined prompt. That is, the amount of processing operations performed by the client model 110 depends on the size of a prompt fed to it; a smaller prompt therefore consumes less resources compared to a larger prompt.

Fifth, after obtaining a task prompt, the client device 104 is able to use the client model 110 without having access to the main system 106. In other words, the computing system 102 allows the client model 110 to operate in offline fashion when online access is unavailable or not desired.

In one variation of the computing system 102 of FIG. 1, the client device 104 represents a local system that includes one or more local computing devices that interact with a local server (not shown) via a local computer network (not shown). In some implementations, the local server handles any of the tasks ascribed above to the single client device 104. For example, the local server can implement the client model 110. The local server can also be the agent which interacts with the main system 106.

Figure 2:
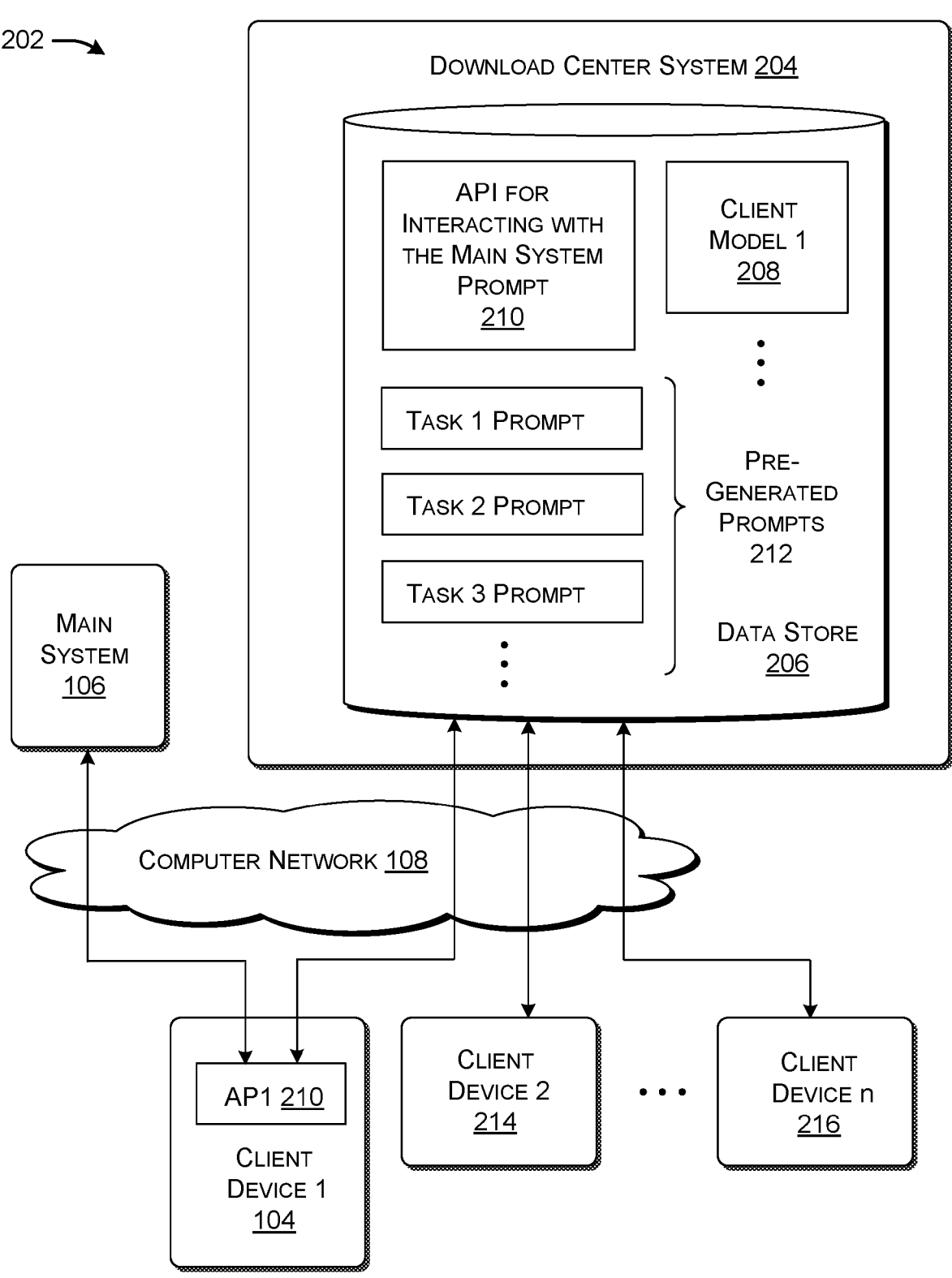
FIG. 2 shows a system in which the client device of FIG. 1 receives an interface program from a network-accessible data store, and then uses the interface program to interact with the main system of FIG. 1.

Advancing to FIG. 2, this figure shows a computing system 202 having a download center system 204 that stores a plurality of modules that can be used by the computing device 104 to perform the technique shown in FIG. 1. More specifically, the download center system 204 corresponds to one or more servers that provide a data store 206 that stores the modules. The modules, for instance, include at least one version of a client model 208, e.g., corresponding to the weights of a language model. The data store 206 also stores an application programming interface (API) 210 or other program interface, which is a computer program by which any client device interacts with the main system 106. Optionally, the data store 206 also stores one or more pre-generated task prompts 212 associated with commonly-applied tasks. The data store 206 also provides a suitable description (not shown) associated with each pre-generated task prompt, which enables a user to understand the target applications associated with the pre-generated task prompt. A client device can download one of these task prompts 212 in lieu of interacting with the main system 106 to obtain a task prompt based on a newly-generated task description.

Assume that the client device 104 is one or a plurality of client devices (including client devices 214 and 216). Reference will be made below to the representative client device 104, but what is said for the client device 104 applies to any other client device.

The client device 104 uses a browser application (not shown) to access the download center system 204 via the computer network 108. The client device 104 may then proceed to download the client model 208 (if the client device 104 does not yet store the client model 208) and the API 210. The client device 104 henceforth uses the API 210 to interact with the main system 106 via the computer network 108. More specifically, the computing device 104 uses the API 210 to submit a new task description to the main system 106, and, in return, receive a task prompt. The prompt-generating component 114 and the client model 110 (shown in FIG. 1) subsequently use the task prompt to process queries associated with the task.

FIG. 3 shows an example of a task description 302 associated with a particular task. The client device 104 forwards the task description 302 to the main system 106, and, in response, receives a task prompt generated by the main-system model 112. As noted above, the task prompt may include abstract elements, the meaning of which may not be readily apparent to a human observer.

The task description includes a preamble 304 that describes a general composition of the task description 302. A second section 306 describes the specific task that the main-system model 112 is expected to carry out. A third section 308 provides one or more examples of how the task is correctly executed, given particular input queries. (The use of more than one example is generally beneficial.) Considered as a whole, the task description 302 describes a pattern-completion task that the main-system model 112 is asked to duplicate when it receives a query from the client device 104. A user or developer is free to compose a task description without constraint, providing that it is sufficiently descriptive. Thus, other task descriptions can differ from the task description 302 shown in FIG. 3 by including different types of information and/or by organizing that information in a different way than is shown in FIG. 3.

B. Illustrative Machine-Trained Model

Figure 4:
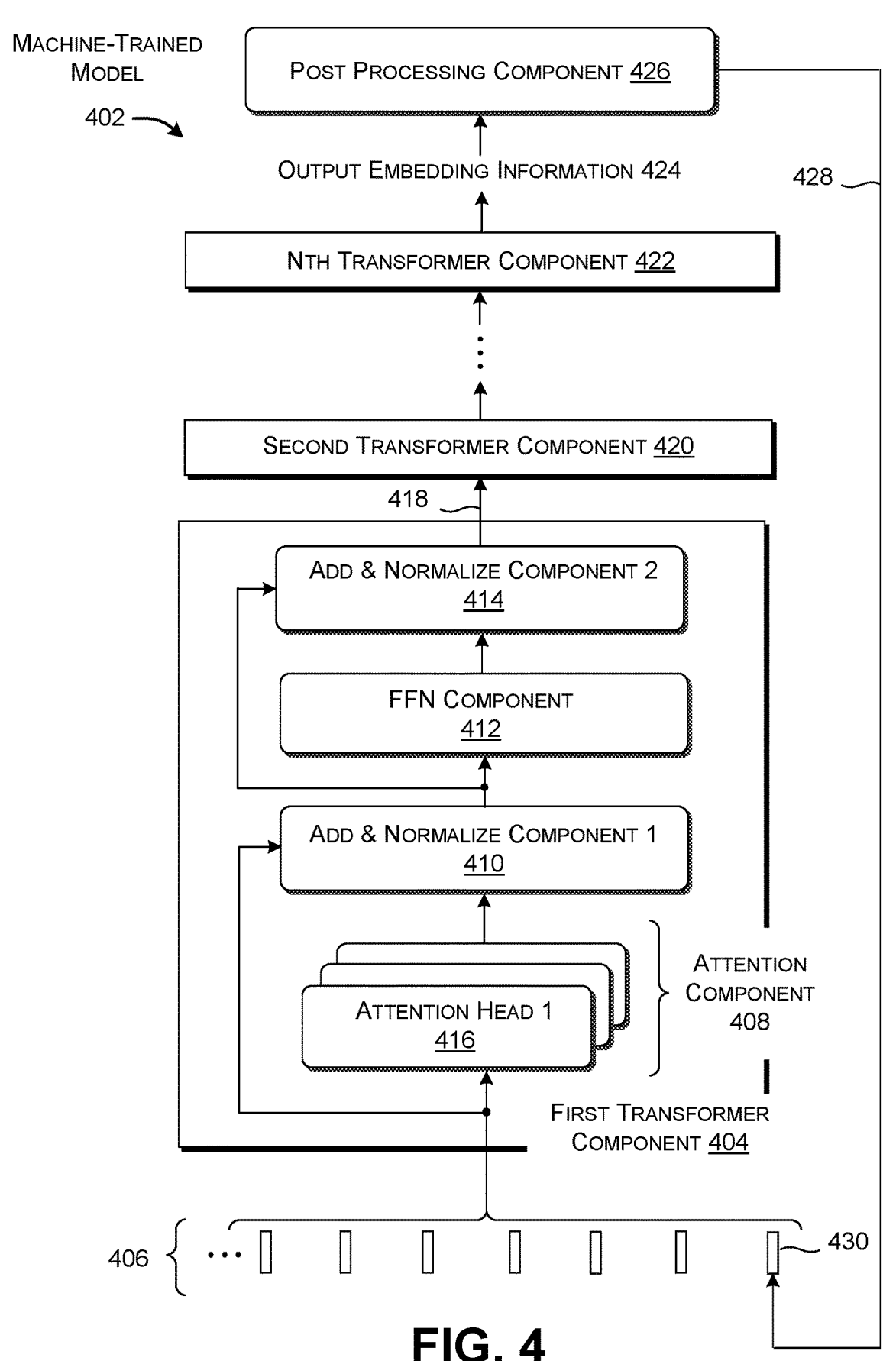
FIG. 4 shows an illustrative machine-trained model for implementing the client model and main-system model of FIG. 1.

FIG. 4 shows one implementation a machine-trained model ("model") 402 for implementing the client model 110 and/or the main-system model 112 of FIG. 1. The model 402 is composed, in part, of a pipeline of transformer components, including a first transformer component 404. FIG. 4 provides details regarding one way to implement the first transformer component 404. Although not specifically illustrated, other transformer components of the model 402 have the same architecture and perform the same functions as the first transformer component 404 (but are governed by separate sets of weights).

The model 402 commences its operation with the receipt of a prompt. The prompt includes a series of linguistic tokens. In some examples, a "token" refers to a unit of text having any granularity, such as an individual word, a word fragment produced by byte pair encoding (BPE), a character n-gram, a word fragment identified by the WordPiece or SentencePiece algorithm, etc. To facilitate explanation, assume that each token corresponds to a complete word. The principles set forth herein, however, are not limited to the processing of text information; in other examples, the model 402 operates on any of: audio information, image information, video information, sensor information, finance-related information, and so on, or any combination thereof.

Next, an embedding component (not shown) maps the sequence of tokens into respective token embeddings. For example, the embedding component can produce one-hot vectors that describe the tokens, and can then map the one-hot vectors into the token embeddings using a machine-trained linear transformation. The embedding component then adds position information (and, in some cases, segment information) to the respective token embeddings to produce position-supplemented embedding vectors 406. The position information added to each token embedding describes the embedding vector's position in the sequence of token embeddings.

The first transformer component 404 operates on the position-supplemented embedding vectors 406. In some implementations, the first transformer component 404 includes, in order, an attention component 408, a first add-and-normalize component 410, a feed-forward neural network (FFN) component 412, and a second add-and-normalize component 414.

The attention component 408 performs attention analysis using the following equation:

$$attn(Q, K, V) = \text{Softmax}\left(\frac{QK^T}{\sqrt{d}}\right)V. \tag{1}$$

The attention component 408 produces query information Q by multiplying the position-supplemented embedding vectors 406 by a query weighting matrix $W^Q$. Similarly, the attention component 408 produces key information K and value information V by multiplying the position-supplemented embedding vectors 406 by a key weighting matrix $W^K$ and a value weighting matrix $W^V$, respectively. To execute Equation (1), the attention component 408 takes the dot product of Q with the transpose of K, and then divides the dot product by a scaling factor $\sqrt{d}$, to produce a scaled result The symbol d represents the dimensionality of Q and K. The attention component 408 takes the Softmax (normalized exponential function) of the scaled result, and then multiplies the result of the Softmax operation by V, to produce attention output information. More generally stated, the attention component 408 determines how much emphasis should be placed on each part of input embedding information when interpreting other parts of the input embedding information, and when interpreting the same part. In some cases, the attention component 408 is said to perform masked attention insofar as the attention component 408 masks output token information that, at any given time, has not yet been determined. Background information regarding the general concept of attention is provided in Vaswani, et al., "Attention Is All You Need," in 31st Conference on Neural Information Processing Systems (NIPS 2017), 2017, 9 pages.

Note that FIG. 4 shows that the attention component 408 is composed of plural attention heads, including a representative attention head 416. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 408 concatenates the output results of the attention component's separate attention heads, and then multiplies the results of this concatenation by another weight matrix $W^O$.

The add-and-normalize component 410 includes a residual connection that combines (e.g., sums) input information fed to the attention component 408 with the output information generated by the attention component 408. The add-and-normalize component 410 then normalizes the output information generated by the residual connection, e.g., by normalizing values in the output information based on the mean and standard deviation of those values. The other add-and-normalize component 414 performs the same functions as the first-mentioned add-and-normalize component 410. The FFN component 412 transforms input information to output information using a feed-forward neural network having any number of layers.

The first transformer component 404 produces output embedding information 418. A series of other transformer components (420, . . . , 422) perform the same functions as the first transformer component 404, each operating on output embedding information produced by its immediately preceding transformer component. Each transformer component uses its own level-specific set of machine-trained weights. The final transformer component 422 in the model 402 produces final output embedding information 424.

In some implementations, a post-processing component 426 performs post-processing operations on the final output embedding information 424. For example, the post-processing component 426 performs a machine-trained linear transformation on the final output embedding information 424, and processes the results of this transformation using a Softmax component (not shown). The model 402 uses the output of the post-processing component 426 to predict the next token in the input sequence of tokens. In some applications, the model 402 performs this task using a greedy selection approach (e.g., by selecting the token having the highest probability), or by using the beam search algorithm (e.g., by traversing a tree that expresses a search space of candidate next tokens).

In some implementations, the model 402 operates in an auto-regressive manner, as indicated by the loop 428. To operate in this way, the model 402 appends a predicted token to the end of the sequence of input tokens, to provide an updated sequence of tokens. The predicted token leads to the production of a new position-supplemented vector 430. In a next pass, the model 402 processes the updated sequence of position-supplemented vectors to generate a next predicted token. The model 402 repeats the above process until it generates a specified stop token.

The above-described implementation of the model 402 relies on a decoder-only architecture. Other implementations of the model 402 use an encoder-decoder transformer-based architecture. Here, a transformer-based decoder receives encoder output information produced by a transformer-based encoder, together with decoder input information.

Other implementations of the model 402 use other kinds of machine-trained models besides, or in addition to, the particular transformer-based architecture shown in FIG. 4. The other machine-trained models include any of convolutional neural networks (CNNs), recurrent neural networks (RNNs), fully-connected feed-forward neural networks (FFNS), stable diffusion models, etc., or any combination thereof.

C. Illustrative Training System

Figure 5:
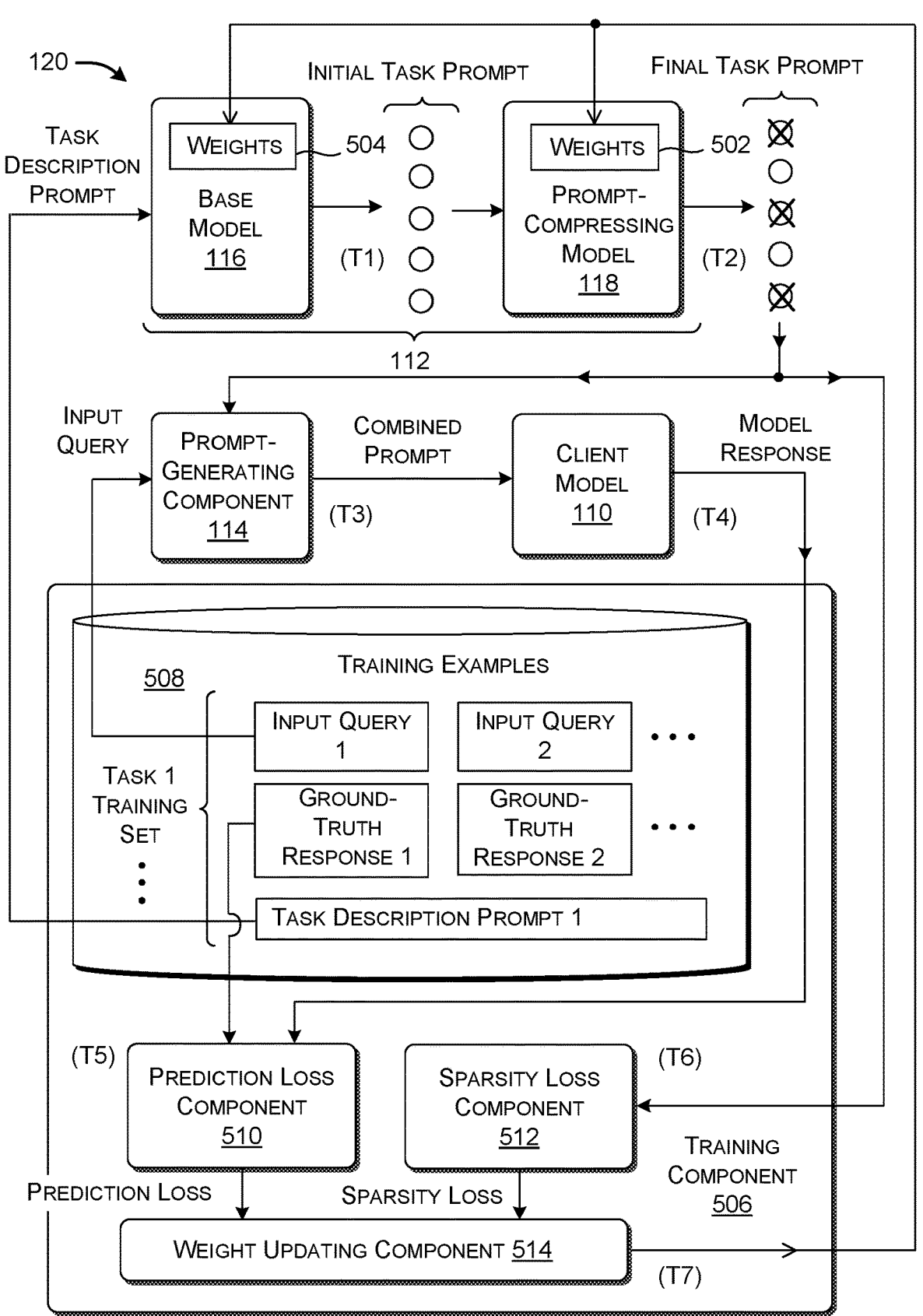
FIG. 5 shows a training system for training the system of FIG. 1.

FIG. 5 shows one example of the training system 120 for training the computing system 102 of FIG. 1. In some implementations, the training system 120 is specifically devoted to updating the weights of the prompt-compressing model 118, while holding weights 504 of the base model 116 and weights (not shown) of the client model 110 constant. In other implementations, the training system 120 updates the weights 502 of the prompt-compressing model 118 and the weights 504 of the base model 116, while holding the weights of the client model 110 constant. Note that, although these two implementations do not involve training the weights of the client model 110, other implementations involve updating these weights, e.g., in an end-to-end fashion with the weights of the main-system model 112.

The training system 120 includes a training component 506 which performs the actual task of updating the weights of the main-system model 112. The training component 506 includes a data store 508 that provides a set of training examples associated with one or more tasks. In some implementations, the training examples include a set of training examples for each of a plurality of tasks. FIG. 5 shows a set of training examples for a first task. The set includes a text-based description of a particular task, a plurality of input queries pertaining to the task, and a plurality of ground-truth responses that provide responses to the input queries that are considered by default as being correct.

The training system 120 also includes a prediction loss component 510 for calculating prediction loss, and a sparsity loss component 512 for computing sparsity loss. Prediction loss assesses the accuracy of the client model 110. Sparsity loss measures the extent to which the main-system model 112 is producing succinct task prompts. Viewed from another perspective, sparsity loss is a measure of an extent to which redundant information has been removed from the initial task prompt. A weight updating component 514 updates the weights of the main-system model 112 based on a measure of total loss, which is some weighted combination of the prediction loss and the sparsity loss. In one implementation, the weight-updating component 514 performs updating using stochastic gradient descent in combination with back-propagation. Generally stated, the training component 506 attempts to iteratively improve the accuracy at which the client model 110 produces model responses, while simultaneously attempting to reduce the size of the task prompts produced by the main-system model 112.

Note that the training performed by the training system 120 differs from the alternative techniques of fine-tuning the weights of the client model 110 or prompt-tuning of soft prompts. The training system 120 trains the main-system model 112 to perform the general task of generating an appropriate task prompt, given a task description. The main-system model 112, once trained, can be used to generate task prompts for newly-submitted task descriptions, without requiring a developer to provide a set of training examples pertaining to this new task. The trained information produced by fine-tuning and prompt-tuning, by contrast, is limited to configuring a machine-trained model to perform a particular task. In other words, the products of these alternative techniques dead-ends in a particular task, and is not extensible to other tasks.

FIG. 5 also shows an example of a flow by which the training system 120 processes a single training example. (Note that, in practice, the training system 120 processes a plurality of training examples in parallel.) To begin with, in some implementations, the base model 116 and the client model 110 include a language model with pre-trained weights. A pre-training system (not shown) pre-trains a language model with respect to one or more generic language-model tasks, unrelated to the specific functions performed by the computing system 102. (Note that the developer may receive a machine-trained model after the pre-training has been performed by others.) Pre-training for generative language models, for example, can include supervised training using language modeling (e.g., predicting the next word in a given text passage and comparing the prediction with the actual next word) and supervised training (e.g., predicting an output result and comparing the prediction with a ground-truth result). Background on the general task of pre-training language models is provided in Devlin, et al., "BERT: Pre-training of Deep Bidirectional Transformers for Language Understanding," arXiv, Cornell University, arXiv:1810.04805v2 [cs.CL], May 24, 2019, 16 pages, and Radford, et al., "Improving Language Understanding by Generative Pre-training," OpenAI, San Francisco California, Jun. 11, 2018, 12 pages. One example of a publicly-available pre-trained model language model is described in Touvron, et al., "LLaMA: Open and Efficient Foundation Language Models," arXiv, arXiv:2302.13971v1 [cs.CL], Feb. 27, 2023, 27 pages. Another example of a publicly-available pre-trained model language model is the BLOOM model described in Scao, et al., "BLOOM: A 176B-Parameter Open-Access Multilingual Language Model," arXiv, Cornell University, arXiv:2211.05100v2 [cs.CL], Dec. 11, 2022, 62 pages.

In operation (T1), the base model 116 transforms a task description into an initial task prompt. In operation (T2), the prompt-compressing model 118 compresses the initial task prompt to a final task prompt. In operation (T3), the prompt-generating component 114 of the client device 104 transforms an input query into a query prompt. The prompt-generating component 114 then concatenates the query prompt with the task prompt produced by the main-system model 112, to produce a combined prompt. In operation (T4), the client model 110 transforms the combined prompt into a model response.

In operation (T5), the prediction loss component 510 determines the difference between the model response and an associated ground-truth response obtained from the data store 508, e.g., using cosine similarity or any other distance metric. In operation (T6), the sparsity loss component 512 computes sparsity loss based on the task prompt produced by the main-system model 112.

Assume that the initial task prompt includes plural elements, such as a set of initial embeddings associated with respective abstract task tokens. In some implementations, the prompt-compressing model 118 uses a linear fully-connected neural network having one or more layers to transform the initial embeddings into transformed embeddings. The prompt-compressing model 118 then uses the Softmax function to assign respective probabilities to the elements of the initial token prompt based on the transformed embeddings. More specifically, each probability defines the chances that a particular element in the initial task prompt will be dropped. The prompt-compressing model 118 makes a decision whether to omit or keep each element based on these probabilities. A value of 0 is used to represent a decision to omit, and a value of 1 is used to represent a decision to retain. These decisions collectively constitute a mask. The prompt-compressing model 118 applies the mask to carry out the actual removal of the rejected elements, e.g., by multiplying the mask by the initial embeddings associated with the initial task prompt. Note that, by updating the weights of the prompt-compressing model 118, the training system 120 also modifies the way it generates a mask.

Note that FIG. 5 shows an example in which a single prompt-compressing model 118 operates on the final output embedding information produced by the base model 116. But in other implementations, an instantiation of the prompt-compressing model 118 operates after each transformer component of the base model 116.

In some implementations, the prediction loss component 510 computes prediction loss for a plurality of training examples using cross entropy. In some implementations, the sparsity loss component 512 computes sparsity loss for a plurality of training examples by comparing the size of each generated task prompt with a target or goal state size.

The use of the prompt-compressing model 118 to compress an initial task prompt is just one way of producing a compact task prompt. In other cases, the weights 504 of the base model 116 are trained to satisfy the dual objective of increasing model accuracy and reducing the sizes of the task prompts that are generated, without the use of the prompt-compressing model 118. For example, as described in Section B, the base model 116 can be implemented by a language model that auto-regressively produces tokens of the task prompt. Leveraging this fact, the training system 120 produces compact task prompts by training the base model 116 to reduce the number of passes that are performed in auto-regression (in which each pass adds another token to the task prompt).

More specifically, in a pass n, the base model 116 generates a probability $\lambda_n$ of halting the auto-regression process, and the client model 110 produces a model output $y_n$ for the task prompt in its current state (including all of the tokens of the task prompt produced thus far). The training system 120 applies this information in a loss function that combines a measure of prediction loss (e.g., produced using cross entropy) and a measure of sparsity loss (e.g., produced using Kullback-Leibler (KL) divergence).

Additional background on the general topic of sparsity loss can be found in Rao, et al., "DynamicViT: Efficient Vision Transformers with Dynamic Token Sparsification," in 35th Conference on Neural Information Processing Systems (NeurIPS 2021), 2021, 13 pages, and Banino, et al., "PonderNet: Learning to Ponder," in 8th ICML Workshop on Automated Machine Learning (2021), 2021, 16 pages.

Other implementations of the training system 120 vary the above-described approach in different respective ways. In one variation, instead of training all of the weights (502, 504) of the main-system model 112, the training system 120 trains a delta-version of the weights (502, 504). In some cases, for instance, the training system 120 decomposes a full matrix of machine-trained weights at a particular layer of the base model 116 into two smaller matrices, and then trains the smaller matrices in lieu of the full matrix of machine-trained weights. In other cases, the training system 120 trains an adapter layer added to the output of a particular layer of the base model 116, while keeping the remainder of the base model's weights fixed. Background information on the general topic of training delta versions of machine-trained models can be found at: Hu, at al., "LoRA: Low-Rank Adaptation of Large Language Models," arXiv, Cornell University, arXiv:2106.09685v2 [cs.CL], Oct. 16, 2021, 26 pages; Houlsby, et al., "Parameter-Efficient Transfer Learning for NLP," arXiv, Cornell University, arXiv: 1902.00751v2 [cs.LG], June 2019, 13 pages; and Pfeiffer, et al., "AdapterFusion: Non-Destructive Task Composition for Transfer Learning," arXiv, Cornell University, 2005.00247v3 [cs.CL], Jan. 26, 2021, 17 pages.

D. Illustrative Processes

FIGS. 6 and 7 show two processes that represent an overview of the operation of the computing system 102 of FIG. 1. Each of the processes is expressed as a series of operations performed in a particular order. But the order of these operations is merely representative, and the operations are capable of being varied in other implementations. Further, any two or more operations described below can be performed in a parallel manner. In one implementation, the blocks shown in the processes that pertain to processing-related functions are implemented by the computing equipment described in connection with FIGS. 8 and 9.

More specifically, FIG. 6 shows a process 602 for interacting with a client machine-trained model (e.g., the client model 110) provided at a client device (e.g., the client device 104). According to block 604, the client device 104 receives a task description associated with a task to be performed using the client machine-trained model. In block 606, the client device 104 submits the task description to a network-accessible main system (e.g., the main system 106), the network-accessible main system providing a main-system machine-trained model (e.g., the main-system model 112). In block 608, the client device 104 receives a task prompt from the main system, the main-system machine-trained model producing the task prompt based on the task description. In block 610, the client device 104 receives a query associated with the task. In block 612, the client device 104 produces a query prompt based on the query. In block 614, the client device 104 produces a combined prompt by combining the query prompt with the task prompt. In block 616, the client device 104 uses the client machine-trained model to produce a model response to the query based on the combined prompt.

FIG. 7 shows a process 702 for interacting with a client device (e.g., the client device 104). In block 704, the main system 106 receives a task description from the client device over a computer network (e.g., the computer network 108), the task description describing a task to be performed by the client device using a client machine-trained model (e.g., the client model 110). In block 706, the main system 106 uses a main-system machine-trained model (e.g., the main-system model 112) to transform the task description into a task prompt. In block 708, the main system 106 sends the task prompt over the computer network to the client device, the client machine-trained model using the task prompt to transform a query pertaining to the task into a model response.

E. Illustrative Computing Functionality

FIG. 8 shows computing equipment 802 that, in some implementations, is used to implement the computing system 102 of FIG. 1. The computing equipment 802 includes a set of local devices 804 coupled to a set of servers 806 via a computer network 808. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 808 is implemented as a local area network, a wide area network (e.g., the Internet), one or more point-to-point links, or any combination thereof.

The bottom-most overlapping box in FIG. 8 indicates that the functionality of the computing system 102 is capable of being spread across the local devices 804 and/or the servers 806 in any manner. In the example of FIG. 1, a local device implements the client model 110, and the servers 806 implement the main-system model 112.

FIG. 9 shows a computing system 902 that, in some implementations, is used to implement any aspect of the mechanisms set forth in the above-described figures. For instance, in some implementations, the type of computing system 902 shown in FIG. 9 is used to implement any local device or any server shown in FIG. 8. In all cases, the computing system 902 represents a physical and tangible processing mechanism.

The computing system 902 includes a processing system 904 including one or more processors. The processor(s) include one or more central processing units (CPUs), and/or one or more graphics processing units (GPUs), and/or one or more application specific integrated circuits (ASICs), and/or one or more neural processing units (NPUs), and/or one or more tensor processing units (TPUs), etc. More generally, any processor corresponds to a general-purpose processing unit or an application-specific processor unit.

The computing system 902 also includes computer-readable storage media 906, corresponding to one or more computer-readable media hardware units. The computer-readable storage media 906 retains any kind of information 908, such as machine-readable instructions, settings, model weights, and/or other data. In some implementations, the computer-readable storage media 906 includes one or more solid-state devices, one or more magnetic hard disks, one or more optical disks, magnetic tape, etc. Any instance of the computer-readable storage media 906 uses any technology for storing and retrieving information. Further, any instance of the computer-readable storage media 906 represents a fixed or removable unit of the computing system 902. Further, any instance of the computer-readable storage media 906 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 902 utilizes any instance of the computer-readable storage media 906 in different ways. For example, in some implementations, any instance of the computer-readable storage media 906 represents a hardware memory unit (such as random access memory (RAM)) for storing information during execution of a program by the computing system 902, and/or a hardware storage unit (such as a hard disk) for retaining/archiving information on a more permanent basis. In the latter case, the computing system 902 also includes one or more drive mechanisms 910 (such as a hard drive mechanism) for storing and retrieving information from an instance of the computer-readable storage media 906.

In some implementations, the computing system 902 performs any of the functions described above when the processing system 904 executes computer-readable instructions stored in any instance of the computer-readable storage media 906. For instance, in some implementations, the computing system 902 carries out computer-readable instructions to perform each block of the processes described with reference to FIGS. 6 and 7. FIG. 9 generally indicates that hardware logic circuitry 912 includes any combination of the processing system 904 and the computer-readable storage media 906.

In addition, or alternatively, the processing system 904 includes one or more other configurable logic units that perform operations using a collection of logic gates. For instance, in some implementations, the processing system 904 includes a fixed configuration of hardware logic gates, e.g., that are created and set at the time of manufacture, and thereafter unalterable. In addition, or alternatively, the processing system 904 includes a collection of programmable hardware logic gates that are set to perform different application-specific tasks. The latter category of devices includes programmable array logic devices (PALs), generic array logic devices (GALs), complex programmable logic devices (CPLDs), field-programmable gate arrays (FPGAs), etc. In these implementations, the processing system 904 effectively incorporates a storage device that stores computer-readable instructions, insofar as the configurable logic units are configured to execute the instructions and therefore embody or store these instructions.

In some cases (e.g., in the case in which the computing system 902 represents a user computing device), the computing system 902 also includes an input/output interface 914 for receiving various inputs (via input devices 916), and for providing various outputs (via output devices 918). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 920 and an associated graphical user interface presentation (GUI) 922. The display device 920 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 902 also includes one or more network interfaces 924 for exchanging data with other devices via one or more communication conduits 926. One or more communication buses 928 communicatively couple the above-described units together.

The communication conduit(s) 926 is implemented in any manner, e.g., by a local area computer network, a wide area computer network (e.g., the Internet), point-to-point connections, or any combination thereof. The communication conduit(s) 926 include any combination of hardwired links, wireless links, routers, gateway functionality, name servers, etc., governed by any protocol or combination of protocols.

FIG. 9 shows the computing system 902 as being composed of a discrete collection of separate units. In some cases, the collection of units corresponds to discrete hardware units provided in a computing device chassis having any form factor. FIG. 9 shows illustrative form factors in its bottom portion. In other cases, the computing system 902 includes a hardware logic unit that integrates the functions of two or more of the units shown in FIG. 9. For instance, in some implementations, the computing system 902 includes a system on a chip (SoC or SOC), corresponding to an integrated circuit that combines the functions of two or more of the units shown in FIG. 9.

The following summary provides a set of illustrative examples of the technology set forth herein.

(A1) According to one aspect, a method (e.g., the process 602) is described for interacting with a client machine-trained model (e.g., the client model 110) provided at a client device (e.g., the client device 104). The method includes: receiving (e.g., in block 604) a task description associated with a task to be performed using the client machine-trained model; submitting (e.g., in block 606) the task description to a network-accessible main system (e.g., the main system 106), the main system providing a main-system machine-trained model (e.g., the main-system model 112), the main-system machine-trained model being larger than the client machine-trained model; receiving (e.g., in block 608) a task prompt from the main system, the main-system machine-trained model producing the task prompt based on the task description; receiving (e.g., in block 610) a query associated with the task; producing (e.g., in block 612) a query prompt based on the query; producing (e.g., in block 614) a combined prompt by combining the query prompt with the task prompt; and using (e.g., in block 616) the client machine-trained model to produce a model response to the query based on the combined prompt.

(A2) According to some implementations of the method of A1, the client device is a user computing device or a local system that includes one or more client devices.

(A3) According to some implementations of the methods of A1 or A2, the main system is implemented by one or more servers.

(A4) According to some implementations of any of the methods of A1-A3, the task description includes a description of an objective of the task, and plural examples of model responses that are to be generated upon the submission of respective queries, in accordance with the task.

(A5) According to some implementations of any of the methods of A1-A4, the method further includes acquiring an interface program from a network-accessible data store, and using the interface program to interact with the main system.

(A6) According to some implementations of any of the methods of A1-A5, the method further includes acquiring a pre-generating task prompt from a network-accessible data store, and using the pre-generated task prompt to interact with the client machine-trained model.

(A7) According to some implementations of any of the methods of A1-A6, the main-system machine-trained model includes a base machine-trained model that provides an initial task prompt, and a prompt-compressing machine-trained model that reduces a size of the initial task prompt, to produce the task prompt that is sent to the client device.

(A8) According to some implementations of any of the methods of A1-A7, the main-system machine-trained model is trained in a training process based on a dual objective of: increasing accuracy of model responses produced using the client machine-trained model in response to submission of combined prompts that include different task prompts; and reducing sizes of the task prompts produced by the main-system machine-trained model.

(A9) According to some implementations of any of the methods of A1-A8, the weights of the client machine-trained model are kept constant during a training process.

(B1) According to another aspect, another method (e.g., the process 702) is described for using a network-accessible main system (e.g., the main system 106) to interact with a client device (e.g., the client device 104). The method includes: receiving (e.g., in block 704) a task description from the client device over a computer network (e.g., the computer network 108), the task description describing a task to be performed by the client device using a client machine-trained model (e.g., the client model 110); using (e.g., in block 706) a main-system machine-trained model (e.g., the main-system model 112) to transform the task description into a task prompt; and sending (e.g., in block 708) the task prompt over the computer network to the client device, the client machine-trained model using the task prompt to transform a query pertaining to the task into a model response.

(B2) According to some implementations of the method B1, the main system is implemented by one or more servers, and the client device is a user computing device.

(B3) According to some implementations of the methods of claim B1 or B2, the task description includes a description of an objective of the task, and plural examples of model responses that are to be generated upon the submission of respective queries, in accordance with the task.

(B4) According to some implementations of any of the methods of B1-B3, the main-system machine-trained system includes: a base machine-trained model that transforms the task description into an initial task prompt; and a prompt-compressing machine-trained model that reduces a size of the initial task prompt, to produce the task prompt that is sent to the client device.

(B5) According to some implementations of the method of B4, the weights of the base machine-trained model are kept constant during a training process.

(B6) According to some implementations of any of the methods of B1-B5, the main-system machine-trained model is trained in a training process based on a dual objective of: increasing accuracy of model responses produced using the client machine-trained model using different task prompts; and reducing sizes of the task prompts produced by the main-system machine-trained model.

(B7) According to some implementations of any of the methods of B1-B6, weights of the client machine-trained model are kept constant during a training process.

(B8) According to some implementations of any of the methods of B1-B7, the main-system machine-trained model is trained in a training process that includes: transforming task descriptions into task prompts associated with respective tasks; receiving model responses to queries produced by the client machine-trained using the task prompts; determining measures of prediction loss by comparing the model responses to associated ground-truth responses, to generate measures of prediction loss; determining measures of sparsity loss based on respective sizes of the task prompts; and using the measures of prediction loss and the measures of sparsity loss to update the main-system machine-trained model.

(B9) According to some implementations of any of the methods of B1-B8, the client machine-trained model has fewer weights than the main-system machine-trained model.

(B10) According to some implementations of any of the methods of B1-B9, the main-system machine-trained model is implemented by a transformer-based machine-trained model, the transformer-based machine-trained model using attention to determine an importance of a particular part of input embedding information when interpreting another part of the input embedding information.

In yet another aspect, some implementations of the technology described herein include a computing system (e.g., the computing system 902) that includes a processing system (e.g., the processing system 904) having a processor. The computing system also includes a storage device (e.g., the computer-readable storage media 906) for storing computer-readable instructions (e.g., information 908). The processing system executes the computer-readable instructions to perform any of the methods described herein (e.g., any individual method of the methods of A1-A9 or B1-B10).

In yet another aspect, some implementations of the technology described herein include a computer-readable storage medium (e.g., the computer-readable storage media 906) for storing computer-readable instructions (e.g., the information 908). A processing system (e.g., the processing system 904) executes the computer-readable instructions to perform any of the operations described herein (e.g., the operations in any individual method of the methods of A1-A9 or B1-B10).

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 912 of FIG. 9. The term "logic" likewise encompasses various physical and tangible mechanisms for performing a task. For instance, each processing-related operation illustrated in the flowcharts of FIGS. 6 and 7 corresponds to a logic component for performing that operation.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for interacting with a client machine-trained model provided at a client device, comprising:
  receiving a task description that describes a task to be performed using the client machine-trained model;
  submitting the task description to a network-accessible main system, wherein the main system includes a main-system machine-trained model, wherein the main-system machine-trained model, as a result of a training process that was performed, includes weights that have learned a vector space associated with the client machine-trained model, wherein weights of the client machine-trained model were held constant throughout the training process that was performed,
  wherein the main-system machine-trained model has been trained in the training process by: transforming task descriptions into task prompts associated with respective tasks; receiving model responses to queries produced by the client machine-trained model using the task prompts; determining measures of prediction loss by comparing the model responses to associated ground-truth responses, to generate measures of prediction loss; and using the measures of prediction loss to update the weights of the main-system machine-trained model without training the weights of the client machine-trained model in the training process;
  receiving a task prompt from the main system, the main-system machine-trained model producing the task prompt based on the task description that is submitted and based on the learned vector space associated with the client machine-trained model, the task prompt being embedding information that expresses a meaning of the task description; and
  using the task prompt to process queries associated with the task,
  wherein the using includes, for each query of the queries associated with the task:
  receiving the query;
  producing a query prompt based on the query;
  producing a combined prompt by combining the query prompt with the task prompt; and
  using the client machine-trained model to produce a model response to the query based on the combined prompt.

2. The method of claim 1, wherein the client device is a user computing device or a local system that includes one or more client devices, wherein the main system is implemented by one or more servers, and wherein the using the task prompt occurs offline, without interaction with the main system.

3. The method of claim 1, wherein the task description that is received includes a description of an objective of the task, and plural examples of model responses that are to be generated upon the submission of respective queries, in accordance with the task.

4. The method of claim 1, further comprising acquiring a pre-generated task prompt from a network-accessible data store, and using the pre-generated task prompt to interact with the client machine-trained model.

5. The method of claim 1, wherein the main-system machine-trained model includes a base machine-trained model that provides an initial task prompt, and a prompt-compressing machine-trained model that compresses the initial task prompt, to produce the task prompt that is sent to the client device.

6. The method of claim 1, wherein the main-system machine-trained model has been trained in the training process based on a measure of loss that is a combination of the prediction loss and sparsity loss, wherein the sparsity loss measures removal of redundant information from the task prompts.

7. A main system for interacting with a client device, comprising:

a data store for storing computer-readable instructions;

a processing system for executing the computer-readable instructions in the data store, to perform operations including:

receiving a task description from the client device over a computer network, the task description describing a task to be performed by the client device using a client machine-trained model;

using a main-system machine-trained model to transform the task description into a task prompt, the task prompt being embedding information that expresses a meaning of the task description, wherein the main-system machine-trained model, as a result of a training process that was performed, includes weights that have learned a vector space associated with the client machine-trained model, wherein weights of the client machine-trained model were held constant throughout the training process that was performed, wherein the main-system machine-trained model has been trained in the training process by: transforming task descriptions into task prompts associated with respective tasks; receiving model responses to queries produced by the client machine-trained model using the task prompts; determining measures of prediction loss by comparing the model responses to associated ground-truth responses, to generate measures of prediction loss; and using the measures of prediction loss to update the weights of the main-system machine-trained model without training the weights of the client machine-trained model in the training process;

sending the task prompt over the computer network to the client device, wherein the client machine-trained model uses the task prompt to transform queries pertaining to the task into model responses by transforming the queries into query prompts, producing combined prompts by combining the query prompts with the task prompt, and producing the model responses based on the combined prompts, wherein the client machine-trained model has fewer weights than the main-system machine-trained model.

8. The main system of claim 7, wherein the main system is implemented by one or more servers, and the client device is a user computing device.

9. The main system of claim 7, wherein the task description that is received includes a description of an objective of the task, and plural examples of model responses that are to be generated upon the submission of respective queries, in accordance with the task.

10. The main system of claim 7, wherein the main-system machine-trained system includes:

a base machine-trained model that transforms the task description into an initial task prompt; and a prompt-compressing machine-trained model compresses the initial task prompt, to produce the task prompt that is sent to the client device.

11. The main system of claim 7, wherein the main-system machine-trained model has been trained in the training process based on a measure of loss that is a combination of the prediction loss and sparsity loss, wherein the sparsity loss measures removal of redundant information from the task prompt prompts.

12. The main system of claim 11, wherein measures of the sparsity loss are based on numbers of elements in the task prompts.

13. A computer-readable storage medium for storing computer-readable instructions, a processing system executing the computer-readable instructions to perform operations in a client device, the operations comprising:

receiving a task description that describes a task to be performed using a client machine-trained model of the client device;

submitting the task description to a network-accessible main system, the main system providing a main-system machine-trained model;

receiving a task prompt from the main system, the main-system machine-trained model producing the task prompt based on the task description, the task prompt being embedding information that expresses a meaning of the task description, wherein the main-system machine-trained model, as a result of a training process that was performed, includes weights that have learned a vector space associated with the client machine-trained model, wherein weights of the client machine-trained model were held constant throughout the training process that was performed, wherein the main-system machine-trained model has been trained in the training process by: transforming task descriptions into task prompts associated with respective tasks; receiving model responses to queries produced by the client machine-trained model using the task prompts; determining measures of prediction loss by comparing the model responses to associated ground-truth responses, to generate measures of prediction loss; and using the measures of prediction loss to update the weights of the main-system machine-trained model without training the weights of the client machine-trained model in in the training process; and using the task prompt to process queries associated with the task, wherein the using includes, for each query of the queries associated with the task:

receiving the query;

producing a query prompt based on the query;

producing a combined prompt by combining the query prompt with the task prompt; and using the client machine-trained model to produce a model response to the query based on the combined prompt.

14. The method of claim 1, further comprising using the client machine-trained model to produce responses for another task for which the main-system machine-trained model has not been trained in the training process.

15. The method of claim 1, wherein each part of the task prompt is an embedding that represents a prompt token, wherein the query prompt is produced using a vocabulary of text-based tokens, and wherein each prompt token differs from each of the text-based tokens.

16. The method of claim 5, wherein the training process that was performed involves training weights of the prompt-compressing machine-trained model while holding weights of the base machine-trained model and the weights of the client machine-trained model fixed throughout the training process.

17. The main system of claim 10, wherein the training process that was performed involves training weights of the prompt-compressing machine-trained model while holding weights of the base machine-trained model and the weights of the client machine-trained model fixed throughout the training process.

18. The method of claim 1, wherein the weights of the main-system machine-trained model are capable of generating task prompts for additional task descriptions not included in the training process, without requiring additional training based on training examples pertaining to the additional task descriptions.

* * * * *